UNITED STATES PATENT OFFICE 2,584,895

TREATMENT OF FLUORIC EFFLUENTS TO OBTAIN AMMONIUM FLUORIDE

Walter H. MacIntire, Knoxville, Tenn., assignor to American Zinc, Lead & Smelting Company, St. Louis, Mo., a corporation of Maine No Drawing. Application October 28, 1949, Serial No. 124,259

5 Claims. (Cl. 23—88)

This invention relates to the production of hydrofluoric acid, preferably in the anhydrous state, from magnesium silicofluoride or materials containing that compound in substantial amount, as well as the recovery of the magnesium content of the starting material in the form of useful by-products. Further the invention includes the collection of fluoric effluents from industrial operations in the form of magnesium silicofluoride or fluosilicate as a starting material for the production of hydrofluoric acid as aforesaid.

The conversion of the fluorine content of the magnesium silicofluoride to hydrofluoric acid is predicated upon a reaction between magnesium silico-fluoride and ammonium hydroxide to produce ammonium fluoride, which in turn is reacted with sulphuric acid to produce hydrofluoric acid. These reactions are represented by the following equations:

$$MgSiF_6 + 6\ NH_4OH =$$
$$Mg(OH)_2 + 6\ NH_4F + SiO_2 + 2H_2O$$

$$6\ NH_4F + 3\ H_2SO_4 = 3\ (NH_4)_2SO_4 + 6\ HF$$

Magnesium silicofluoride or fluosilicate ($MgSiF_6$) is a known material that can be produced in various ways such as by reacting magnesium hydroxide or carbonate with hydrofluosilicic acid. Also it is produced, usually with some impurities, when mineral magnesium silicates such as olivine and serpentine are used to collect fluoric effluents from industrial operations so as to prevent fluoric contamination of the atmosphere, a process disclosed and claimed per se in my copending application Serial No. 124,258, filed October 28, 1949, and described in greater detail hereinafter.

In carrying out the reactions represented by the foregoing equations, the magnesium silico-fluoride from any such source, or obtained in any other suitable way, is first brought into solution or solution-suspension in an aqueous medium, the magnesium silico-fluoride being soluble in water to the extent of 23 grams in 100 parts of water at 20° C. and 60 grams in the same amount of water at 60° C. The solution or solution-suspension is then treated with ammonium hydroxide, as for example by adding ammonia to the aqueous solution in the approximate proportions indicated in the first equation set forth above, with consequent formation of a solution of ammonium fluoride and the precipitation of magnesium hydroxide and silica. The co-precipitated magnesium hydroxide and silica are preferably separated from the solution in any suitable manner, as by filtration or centrifuging, and the separated mixture can be used as a source of fertilizer material. Also the magnesium content of the separated mixture can be dissolved by means of carbonated water or by means of a mineral acid to effect separation of the magnesium solute from the silica solid through filtration or centrifuging, the magnesium solute then being recovered from its solution in any desired manner.

After the separation of the precipitated $Mg(OH)_2$ and $SiO_2$, the ammonium fluoride solution is concentrated by evaporation or salted with an excess of ammonia and then treated with sulphuric acid to evolve hydrofluoric acid according to the second equation set forth above, the hydrofluoric acid being recovered through distillation. The ammonia used in the process can be recovered as such or in the form of ammonium sulphate.

When it is desired to produce anhydrous hydrofluoric acid from the ammonium fluoride, that material should be dried and appropriate precautions should be taken to avoid the presence of moisture in the distillation system. Thus the ammonium fluoride is recoverable from its solution before the fluoride is treated with sulphuric acid, as by evaporation of the solution of ammonium fluoride to dryness or by suitable crystallization procedures, the fluorine then being dissolved in concentrated sulphuric acid and the resultant acidic solution being distilled to evolve anhydrous hydrofluoric acid in a dry system. The distillation system should be kept virtually free of moisture before and during the distillation by suitable regulation of the proportion of concentrated sulphuric acid and of the temperature of the distillation system. If desired, the distillation gases may be passed further through concentrated sulphuric acid or dehydrated in any other suitable manner.

The process described above is especially useful in combination with the collection of fluoric effluents from industrial operations, such as the manufacturing of fertilizers, of steel and of aluminum, by the use of mineral silicates of magnesium, which process is disclosed and claimed per se in my copending application mentioned above. The industrial fluoric effluents may include hydrofluoric acid, hydrofluosilicic acid, and silicon tetrafluoride. Such effluents may be reacted with and retained, in leachable form, by the mineral magnesium silicates which occur in immense quantities in the deposits of forsterite olivine in North Carolina and Georgia, and also in similar deposits at other locations. In North Carolina these olivine deposits contain 75–95% of forsterite (magnesium silicate) and 45–50% of magnesia, along with small amounts of other elements such as iron, chromium, aluminum, etc. In some cases degradation of olivine has altered it to serpentine and to steatite, both being hydrated forms of magnesium silicates. For the collection of fluoric effluents, these mineral magnesium silicates can be used in their naturally occurring forms. However, if a hydrated form such as serpentine or steatite is calcined to drive off its water of hydration, the mineral is rendered granular and more reactive.

The several reactions that may take place to effect the collection of the fluoric effluents are represented simply by the following equations:

$$H_2SiF_6 + MgSiO_3 = MgSiF_6 + SiO_2 + H_2O$$
$$3\ H_2F_2 + MgSiO_3 = MgSiF_6 + 3\ H_2O$$
$$3\ SiF_4 + 2\ H_2O = 2\ H_2SiF_6 + SiO_2$$

When such magnesium silicate minerals are used to collect fluoric effluents, the reaction takes place readily and the predominant resultant is magnesium silicofluoride or fluosilicate ($MgSiF_6$), although there also may be some formation of magnesium fluoride. The product can be recovered in solid form in which magnesium silicofluoride hexahydrate predominates, together with some unreacted magnesium silicate, liberated silica and impurities. However, one of the important advantages of this process for the purposes of the present invention is that magnesium silicofluoride has a high degree of solubility. Hence the solid material mentioned above can be leached, or water can be provided during the absorption of the fluoric effluents, in order to produce a relatively concentrated aqueous solution of magnesium silicofluoride to be ammoniated as set forth above.

In practice, the effluents are passed upwardly or channeled laterally through a charge or a bed of crushed magnesium silicate mineral in any suitable manner to bring the fluoric effluents into good contact with the crushed mineral. The lumps should be sized to permit the ready passage of the gases while serving to remove the fluorine content of the effluents. Experience will serve to establish in each case the most effective relationship between the volume of the effluents and the concentration of fluoric compounds therein, in relation to the proper sizing and the depth of the charge of the magnesium silicate mineral, and the replenishment of the latter in a continuous operation. By way of example, a tower is charged with a layer of from six to eight feet in thickness, the particle size varying from 1" to 2½" in diameter.

Under conditions of mineral moisture in the effluents, a mixture of the generated $MgSiF_6$ and the liberated $SiO_2$ can be collected in solid form. For example, the charge can be subjected to vibration and the solid mixture collected by gravity, or the reacted material can be extracted or treated in any other manner suitable for the intended purpose. The impure solid material can be mixed with water to provide a solution or solution-suspension of magnesium silicofluoride for treatment with ammonium hydroxide as set forth above, or if a purer material is desired, the solid reaction product can first be leached with water as stated above and extraneous concomitants removed from the leachate through precipitation.

For the purpose of the present invention, however, it is preferred to introduce enough water in the form of jets or sprays to trickle through the charge and dissolve and percolate the engendered magnesium silicofluoride from the surfaces of the lumps of the mineral silicates. This procedure provides a more convenient method for the collection of the reaction product, removing it as formed, so that the desired contact between the effluents and the unreacted mineral is maintained. In the case of such water addition, the resultant product is a solution of $MgSiF_6$ that is ready for direct treatment with ammonium hydroxide, according to the reaction set forth above.

In some cases, the effluents may be passed into a tower provided with water sprays to capture the fluoric materials in acidic form, the aqueous acid solution then being passed by gravity or otherwise through a bed of magnesium silicate mineral. In this case the resultant solution of $MgSiF_6$ will be similar to the solutions mentioned above and can be handled in like manner. If desired, the solution can be recirculated through the bed of the silicate mineral to increase the concentration of solute $MgSiF_6$.

It will be understood that any above mentioned solution of $MgSiF_6$ can be purified in any suitable manner before it is used in the aforesaid reaction. For example, the magnesium silicate materials often contain iron which may occur in the $MgSiF_6$ solution and such impurity can be removed through precipitation by means of added MgO and filtration or centrifugation.

It will be seen that the collection of fluoric effluents by means of the process of my aforesaid copending application not only supplies starting fluoride-absorption materials in large quantities and at low cost for use in the reactions set forth above, but the process also can be integrated with the prescribed reactions in a continuous operation. In such cases two principal objectives are accomplished. The collection of fluoric effluents is facilitated through the use of naturally occurring materials that are available in large quantities at low cost, with resultant avoidance of nuisances and elimination of serious detrimental effects upon plant and animal life. An economical means also is provided for the ready production of hydrofluoric acid, which material is essential to the chemistry of major industries, such as those of the heavy metals, ceramics, oil refining and in uranium manipulations.

It will be understood that the invention is not restricted to the details of the foregoing description and that reference should be had to the appended claims for a definition of its limits.

What is claimed is:

1. A process for the production of ammonium fluoride which comprises the passing of fluoric effluents in contact with mineral magnesium silicate, forming an aqueous solution of the resultant magnesium silicofluoride and reacting that solution with ammonia, and separating the ammonium fluoride thus formed.

2. A process for the production of ammonium fluoride which comprises the contacting of water and mineral magnesium silicate with effluents containing at least one fluoric constituent of the group consisting of silicon tetrafluoride, hydrofluosilicic acid, and hydrogen fluoride to form a solution of magnesium silicofluoride, reacting said solution with ammonium hydroxide, separating a solution of ammonium fluoride from the reaction mixture and recovering the ammonium fluoride from its solution in substantially dry state.

3. A process for the production of ammonium fluoride which comprises the contacting of water and mineral magnesium silicate with effluents containing at least one fluoric constituent of the group consisting of silicon tetrafluoride, hydrofluosilicic acid, and hydrogen fluoride to form a solution of magnesium silicofluoride, introducing ammonia into that solution, separating the precipitated magnesium hydroxide and silica from the resultant solution of ammonium fluoride, and recovering the ammonium fluoride from its solution in substantially dry state.

4. The process which comprises the contacting of water and mineral magnesium silicate with effluents containing at least one fluoric constituent of the group consisting of silicon tetrafluoride, hydrofluosilicic acid, and hydrogen fluoride to form a solution of magnesium silicofluoride, reacting said solution with an ammoniating agent of the group consisting of ammonia and ammonium hydroxide and separating a solution of ammonium fluoride from the reaction mixture, and recovering the ammonium fluoride from its solution.

5. A process for the production of ammonium fluoride which comprises the passing of fluoric effluents in contact with mineral magnesium silicate, reacting the resultant magnesium silicofluoride with an ammoniating agent of the group consisting of ammonia and ammonium hydroxide, and recovering the resultant ammonium fluoride in substantially dry state.

WALTER H. MacINTIRE.

REFERENCES CITED

The following references are of record in the file of this patent:

UNITED STATES PATENTS

| Number | Name | Date |
| --- | --- | --- |
| 582,938 | Mills | May 18, 1897 |
| 1,426,890 | McClenahan | Aug. 22, 1922 |
| 1,642,896 | Sander | Sept. 20, 1927 |
| 1,748,735 | Scott | Feb. 25, 1930 |
| 1,812,770 | Bishop | June 30, 1931 |
| 2,047,210 | Lawrence | July 14, 1936 |

OTHER REFERENCES

J. W. Mellor's "Inorganic and Theoretical Chemistry," vol. 2, page 516, 1922 ed. Longmans, Green & Co., New York.

"Handbook of Chemistry and Physics," 28th ed., 1944, pages 408–409, by C. D. Hodgman Chem. Rubber Pub., Cleveland.